US 10,024,478 B2

(12) United States Patent
Kloft et al.

(10) Patent No.: US 10,024,478 B2
(45) Date of Patent: Jul. 17, 2018

(54) DAMPING DEVICE

(71) Applicants: Hydac Technology GmbH, Sulzbach/Saar (DE); Airbus Operations GmbH, Hamburg (DE)

(72) Inventors: Peter Kloft, Ransbach-Baumbach (DE); Robert Marinus Behr, Weyhe (DE); Arne Waitschat, Hamburg (DE); Frank Thielecke, Buxtehude (DE)

(73) Assignees: HYDAC TECHNOLOGY GMBH, Sulzbach/Saar (DE); AIRBUS OPERATIONS GMBH, Hamburg (DE)

( * ) Notice: Subject to any disclaimer, the term of this patent is extended or adjusted under 35 U.S.C. 154(b) by 280 days.

(21) Appl. No.: 14/625,663

(22) Filed: Feb. 19, 2015

(65) Prior Publication Data

US 2015/0308602 A1  Oct. 29, 2015

(30) Foreign Application Priority Data

Apr. 24, 2014  (DE) ................. 10 2014 005 822
Apr. 24, 2014  (DE) ................. 20 2014 006 687 U

(51) Int. Cl.
*F16L 55/05* (2006.01)
*F04B 11/00* (2006.01)

(52) U.S. Cl.
CPC .......... *F16L 55/05* (2013.01); *F04B 11/0091* (2013.01)

(58) Field of Classification Search
CPC ......... F16L 55/045; F16L 55/04; F16L 55/05; F16L 55/041; F04B 11/091; F04B 11/001; F04B 11/003

USPC ..................................................... 138/26, 30
See application file for complete search history.

(56) References Cited

U.S. PATENT DOCUMENTS

| 4,163,461 | A | * | 8/1979 | Jacobellis | ............. F16L 55/053 138/30 |
| 4,383,551 | A | * | 5/1983 | Lynch | ................... F16L 55/052 137/593 |
| 4,548,713 | A | * | 10/1985 | Schmid | .................. G01N 30/32 210/198.2 |
| 4,939,405 | A | * | 7/1990 | Okuyama | ............. F04B 43/046 310/317 |
| 5,070,983 | A | * | 12/1991 | Leigh-Monstevens | . F16D 25/14 192/109 F |

(Continued)

FOREIGN PATENT DOCUMENTS

| DE | 10 2009 030 565 A1 | 12/2010 |
| DE | 10 2009 046 578 A1 | 5/2011 |

*Primary Examiner* — Craig Schneider
*Assistant Examiner* — David Deal
(74) *Attorney, Agent, or Firm* — Wenderoth, Lind & Ponack, L.L.P.

(57) ABSTRACT

A damping device damps or prevents pressure shocks, such as pulsations, in hydraulic supply circuits, preferably in the form of a silencer, and has a damping housing (1) surrounding a damping chamber (19), with a fluid inlet (11) and a fluid outlet (13). A fluid receiving chamber (19) extends between the fluid inlet and fluid outlet. During operation of the device, a fluid flow coming from the fluid inlet (11) in a through-flow direction (15) traverses the damping chamber (19) toward the fluid outlet (13). Parts of the fluid receiving chamber (19) extend in a direction transverse to the through-flow direction (15). The fluid receiving chamber (19) is located directly adjacent to the fluid inlet (11) and the fluid outlet (13).

25 Claims, 3 Drawing Sheets

(56) References Cited

U.S. PATENT DOCUMENTS

| | | | | |
|---|---|---|---|---|
| 6,148,614 A | * | 11/2000 | Nix | F16D 25/088 |
| | | | | 138/30 |
| 6,901,964 B2 | * | 6/2005 | Kippe | F16L 55/053 |
| | | | | 123/467 |
| 7,942,650 B2 | * | 5/2011 | Kitahara | F04B 43/046 |
| | | | | 138/30 |
| 2010/0107904 A1 | * | 5/2010 | Kelly | G01F 1/72 |
| | | | | 100/74 |

* cited by examiner

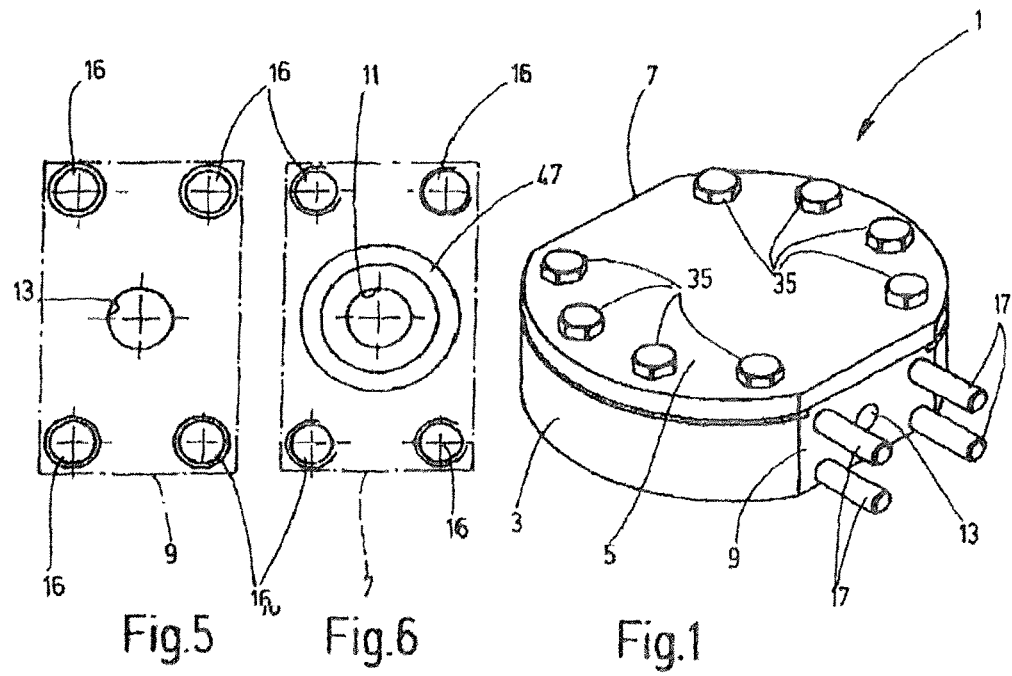
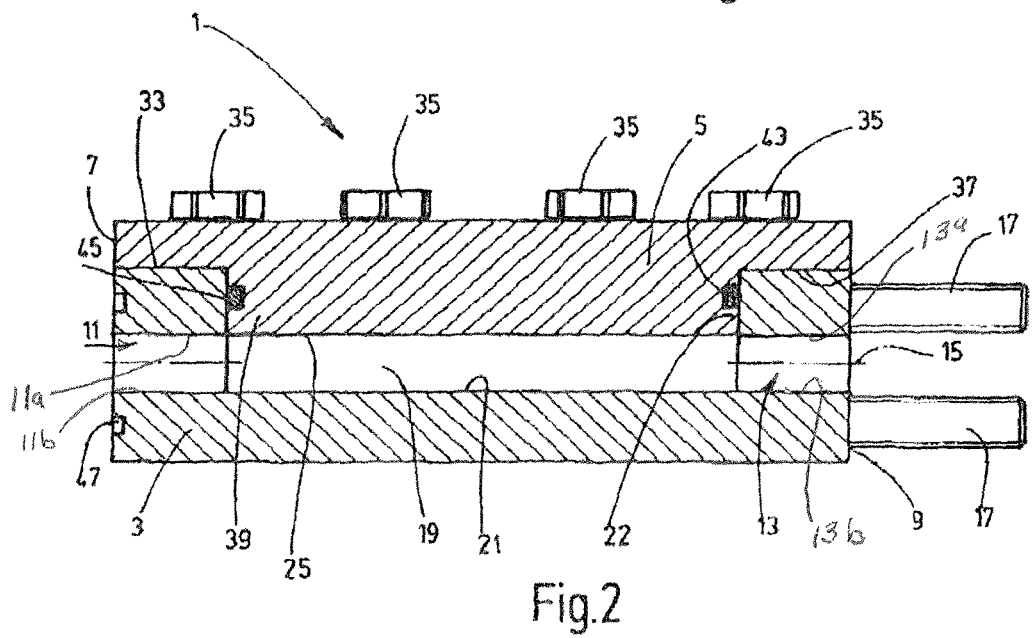

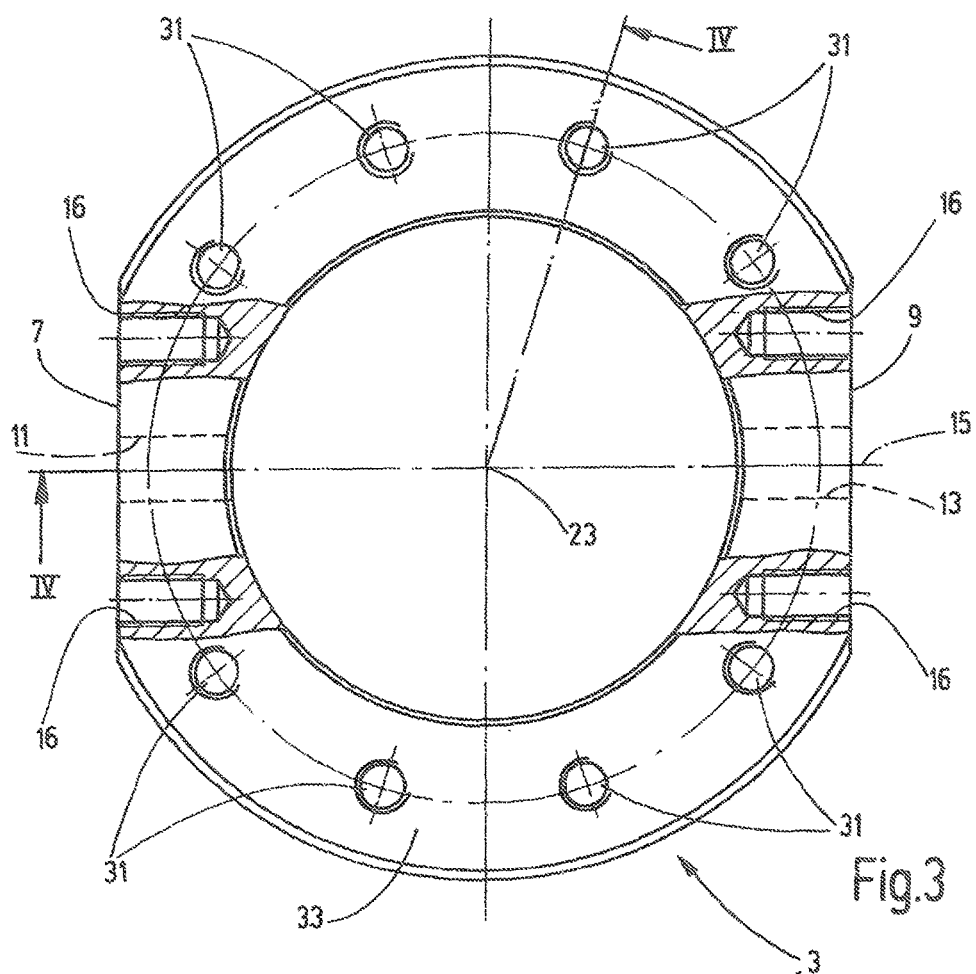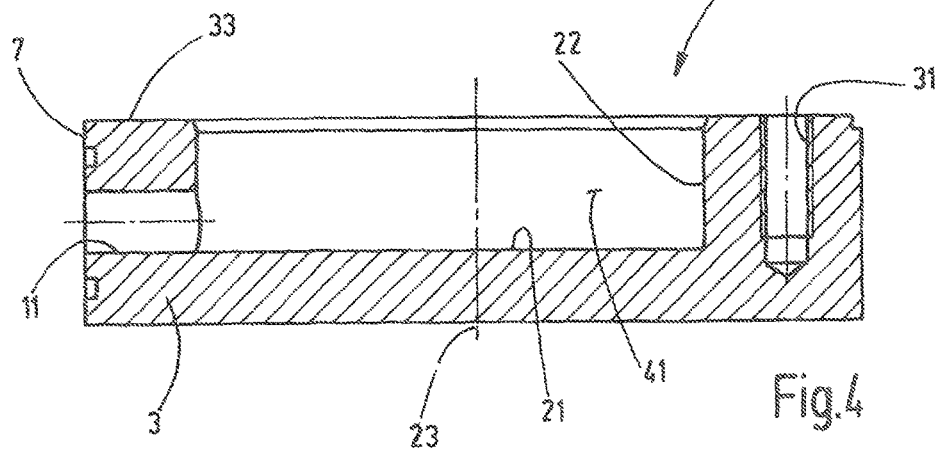

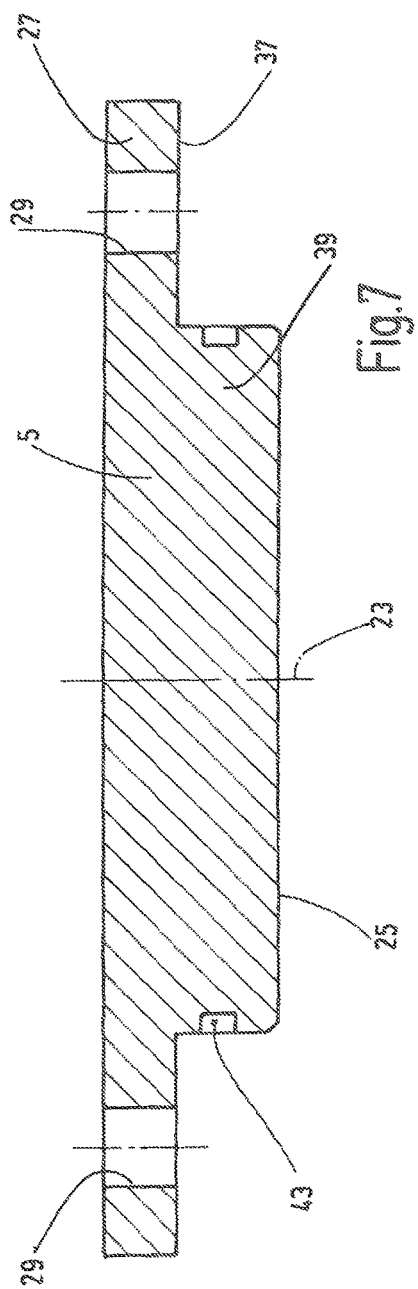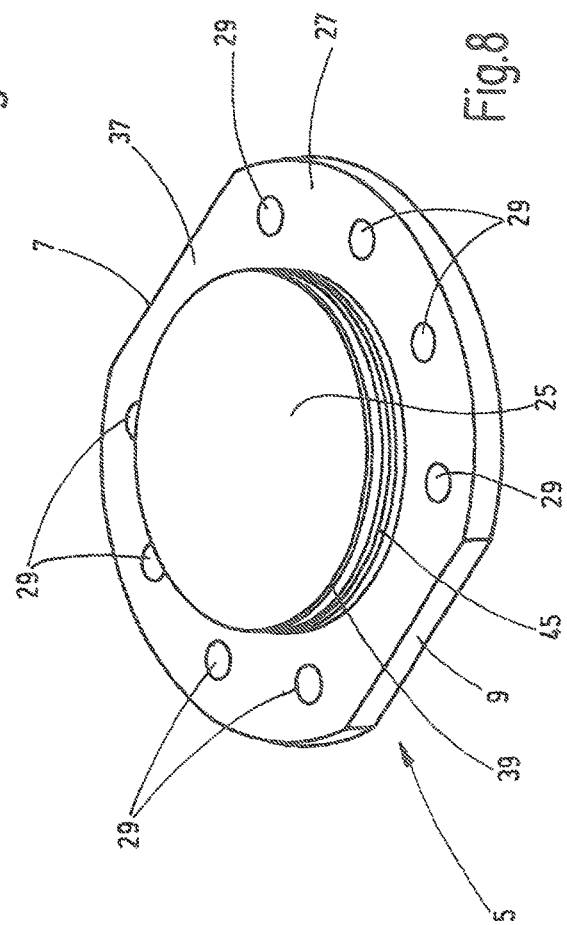

DAMPING DEVICE

FIELD OF THE INVENTION

The invention relates to a damping device, in particular, for damping or preventing pressure shocks, such as pulsations, in hydraulic supply circuits. The damping device is preferably in the form of a silencer having a damping housing surrounding a damping chamber. The damping chamber includes at least one fluid inlet and at least one fluid outlet, as well as a fluid receiving chamber extending between the fluid inlet and fluid outlet. During operation of the device, a fluid flow coming from the fluid inlet in a through-flow direction traverses the damping chamber in the direction of the fluid outlet. At least parts of the fluid receiving chamber extend in at least one direction of extension transverse to the through-flow direction.

BACKGROUND OF THE INVENTION

Damping devices of this type are prior art. Such hydraulic dampers, also called noise dampers or silencers, are used to reduce the vibrations generated by pressure pulsations. Pressure pulsations are periodically imparted to a related hydraulic system, in particular, as a result of the operation of the hydraulic pumps. As shown in DE 102 17 080 C1, the known damping devices of this kind have a damping housing in the form of a circular cylinder, which is spherically rounded at both axial end sections. A fluid inlet and a fluid outlet are situated at each end section coaxially to the cylindrical axis. In these damping devices, the damping chamber, which the fluid flow traverses from the fluid inlet to the fluid outlet, is provided in the form of a damping tube. The damping tube extends coaxially between the fluid inlet and the fluid outlet, and includes openings in the tube wall to the fluid chamber surrounding the tube. The fluid chamber, in conformity with the cylinder diameter, is expanded radially relative to the axial through-flow direction predefined by the damping tube.

SUMMARY OF THE INVENTION

An object of the invention is to provide an improved damping device of the kind under consideration that is simple in design and is distinguished by an advantageous operating behavior.

This object is basically achieved by a damping device according to the invention, having, as an essential characteristic of the invention, a fluid receiving chamber that is directly adjacent to the fluid inlet and to the fluid outlet. In the design, simplified by the omission of the damping tube, a single cavity forms a resonator system formed together from a damping chamber and a fluid chamber. The device according to the invention is distinguished not only by a simplified design, but also by an enhanced efficiency in terms of its fluid volume and weight. As compared to known silencers of this kind, in which an amplification of pulsations between the pump and entry to the silencer may result, this risk is also significantly reduced in the case of the invention.

A particularly high efficiency of the damping effect may be achieved in exemplary embodiments, in which the fluid receiving chamber forms a cavity in the form of a disk within the damping housing. The disk shape may be cylindrical or designed as a polygon or may have any other non-circular shape.

The configuration may be particularly advantageously achieved in that the cavity is closed by two partition walls of the damping housing extending parallel to one another. Parts of the fluid inlet and fluid outlet are aligned with these partition walls in the damping housing. In such configuration, the diameter of the fluid inlet and fluid outlet, formed as damping housing bores, may be of equal size and may correspond to the distance between the two partition walls.

In a particularly advantageous exemplary embodiment of the invention, in which the damping housing is designed in multiple parts, the following components may be provided.

a pot-shaped bottom part, which accommodates a disk-shaped central recess with the one partition wall and the fluid inlet and fluid outlet, and a cover part designed as a flange, which, together with the other partition wall as part of an engagement connection with the cover part affixed to the bottom part, is engaged in the central recess such that it is aligned therewith.

To seal the cavity from the environment, a seal, in particular, in the form of a sealing ring inserted in a circumferential groove, may be disposed on the engagement connection of the cover part, which forms a seal at the central recess of the pot-shaped bottom part.

For a pressure-resistant design of the damping housing, the cover part may include multiple through-bores diametrically opposite its vertical axis, through which fixing screws are passed to affix the cover part to the bottom part.

The fixing screws are preferably disposed uniformly along an outer periphery on the damping housing, which outer periphery encompasses the disk-shaped fluid receiving chamber, while leaving the areas of the fluid inlet and fluid outlet exposed.

To connect to a particular hydraulic system, a seating for a sealing ring, which encompasses the fluid inlet and/or the fluid outlet, may be provided at the fluid inlet and/or at the fluid outlet in the damping housing. The damping housing may be affixed to third components in the manner of a fixing block by multiple fixing bolts, which surround the area of the fluid inlet and/or fluid outlet.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a perspective view of a damping device according to an exemplary embodiment of the invention, drawn reduced to a scale of approximately 1:3 as compared to a practical embodiment;

FIG. 2 is a side view in section of the exemplary embodiment drawn slightly reduced in size as compared to a practical embodiment;

FIG. 3 is a top view of the bottom part of the damping housing of the exemplary embodiment in the scale of FIG. 2 drawn partially in section;

FIG. 4 is a side view in section taken along the section line IV-IV of FIG. 3;

FIG. 5 is a partial side view of only the connection area of the damping housing of the exemplary embodiment, which connection area includes the fluid outlet.

FIG. 6 is a partial side view of only the connection area of the damping housing of the exemplary embodiment, which connection area includes the fluid entry;

FIG. 7 is a side view in section of only the cover part of the damping housing drawn on a larger scale as compared to FIGS. 2 through 4; and FIG. 8 is a perspective diagonal view of the cover part, as viewed toward the inner side, which inner side forms an engagement connection.

DETAILED DESCRIPTION OF THE INVENTION

FIGS. 1 and 2 show an exemplary embodiment of the damping device in the assembled state. The damping housing 1, depicted as closed in these figures, comprises two main parts, namely, a bottom part 3, which is depicted separately in FIGS. 3 and 4, as well as a cover part 5, which is shown separately in FIGS. 7 and 8. The bottom part 3 and cover part 5 each have the same contour, so that in the assembled state (FIG. 1) they are circumferentially aligned with one another. The contour corresponds to a circle, but with a planar flat portion 7 and 9 on each of two sides diametrically opposite one another. The fluid inlet 11 of the damping housing 1 is situated in the part of the flat portion 7 associated with the bottom part 3. The fluid outlet 13 is situated in the part of the flat portion 9 associated with the bottom part 3. The inlet 11 and the outlet 13 are aligned flush with the axis of the through-flow direction 15 (FIG. 3). Four threaded bores 16 each are situated in the flat portions 7 and 9, are disposed in the corner areas of the rectangular-shaped flat portions 7 and 9, and enable the damping housing 1 to be fixed by threaded bolts 17 (FIG. 1).

Within the damping housing 1, the fluid receiving chamber extends between the fluid inlet 11 and the fluid outlet 13, acts concurrently as a damping chamber, and is formed by a cavity in the form of a disk-shaped space 19. Space 19 has the shape of a circular disk in the form of a flat circular cylinder. One disk face is bordered by a flat or planar wall 21, which forms the inner bottom face of space 19 in the bottom part 3. Bottom part 3 is formed in a pot-shaped manner by a central, hollowed central recess 41. As is most clearly seen from FIG. 4, the bottom part 3 delimits, with the inner side wall 22 of the pot, the circular diameter of the circular disk-shaped hollow space 19 in relation to the central axis 23. The fluid inlet 11 and fluid outlet 13 are each formed by bores in the flat portions 7 and 9, merging flush in the hollow space 19 with the partition wall 21, which forms the interior bottom of the pot.

The upper partition wall of the disk-shaped hollow space 19 in FIG. 2 is formed by a flat or planar, circular wall 25 on the cover part 5. In the assembled state, see FIG. 2, the wall 25, as does the other partition wall 21, aligns with the respective fluid inlet 11 and fluid outlet 13. If, in a practical exemplary embodiment, the fluid inlet 11 and fluid outlet 13 are formed, for example, by one bore each 12 mm in diameter, the disk-shaped hollow-space 19 has a depth of 12 mm. The partition walls 25, 21 define opposite sides of damping chamber 19 along the entire extent of damping chamber 19 between fluid inlet 11 and fluid outlet 12. The opposite transverse cross-sectional portions 11a, 11b of inlet 11 and the opposite transverse portions 13a, 13b of outlet 13 are axially aligned with partition walls 25, 21, respectively. Specifically, portions 11a and 13a are aligned along the axial direction of inlet 11 and outlet 13 with the plane of partition wall 25, and portions 11b and 13b are aligned along the axial direction of inlet 11 and outlet 13 with the plane of partition wall 21, as shown in FIG. 2, particularly since the diameters of inlet 11 and outlet 13 are equal to the depth of chamber 19 (i.e., the spacing of partition walls 21, 25). In such an exemplary embodiment, the inner diameter of the hollow space 19 may be in the range of 100 mm, with an outer diameter of the damping housing 1, outside the flat portions 7, 9, being in the range of 160 mm, for example.

As shown in FIGS. 7 and 8, the cover part 5 includes a flange part 27 with fastening holes 29. The flange part 27 has the same contour as the bottom part 3, thus, is circular, apart from the flat portions 7 and 9, resulting in the uninterrupted outer shape for the entire assembled device, as is depicted in FIG. 1. The fastening holes 29, as shown in FIG. 8, are provided on an arc, each beyond the area of the flat portions 7, 9. Threaded bores 31 matching the fastening bores 29 are provided in the bottom part 3, which are formed as blind holes in the planar upper side 33 of the bottom part 3, and which are provided for fastening screws 35. Screws 35 penetrate the fastening holes 29 to affix the cover part 5 with its flange surface 37 to the upper side 33 on the open side of the pot of the bottom part 3.

In the fixed state, a cylindrical engagement connection extending coaxially from the flange surface 37 of the cover part 5 engages in the center recess 41 in the bottom part 3, which is delimited by the inner side wall 22 of the pot of the bottom part 3. This engagement in the screw-connected state is shown in FIG. 1. The wall 25 at the end of the engagement connection 39 forms the upper partition wall of the hollow space 19. A sealing ring 45 is inserted in an annular groove 43 incorporated in the side wall of the engagement connection 39 for sealing the hollow space 19 with respect to the cover part 5. As shown in FIG. 6, an annular groove 47 for a sealing element, which provides a seal at the connection point, is provided on the flat portion 7 associated with the fluid inlet 11. A corresponding sealing arrangement may be similarly provided on the flat portion 9 associated with the fluid outlet. Due to the symmetrical housing design, the inlet and outlet side can be switched, having optionally modified sealing geometries, with one another. The disk-shaped damping chamber, having a cavity extended in a direction transverse to the actual through-flow direction, results in a silencer having high efficiency, and a low weight relative to its predefinable flow volume. Furthermore, only a minimal amplification, if any at all, occurs between the silencer and a hydraulic pump connected to it.

While one embodiment has been chosen to illustrate the invention, it will be understood by those skilled in the art that various changes and modifications can be made therein without departing from the scope of the invention as defined in the claims.

The invention claimed is:

1. A damping device for damping pressure shocks in hydraulic supply circuits, the damping device comprising:
   a damping housing surrounding a damping chamber;
   a fluid inlet in said damping housing directly adjacent to and connected to said damping chamber in fluid communication;
   a fluid outlet in said damping housing directly adjacent to and connected to said damping chamber in fluid communication, said damping chamber extending between said fluid inlet and said fluid outlet such that a fluid flow from said fluid inlet in a through-flow direction traverses said damping chamber in a direction of said fluid outlet;
   parts of said damping chamber extending in at least one direction of extension transverse to the through-flow direction; and
   planar and parallel first and second partition walls defining opposite sides of said damping chamber an entire extent thereof between said fluid inlet and said fluid outlet, opposite transverse cross-sectional portions of said fluid inlet and said outlet being axially aligned with respective planes of the respective partition walls, said fluid inlet and said fluid outlet having equal cross-sectional diameters equal to a distance spacing said partition walls.

2. A damping device according to claim 1 wherein
said damping chamber comprises a disk-shaped hollow space in said damping housing.

3. A damping device according to claim 2 wherein
said hollow space is at least one of cylindrical or polygon.

4. A damping device according to claim 1 wherein
said damping chamber is free of damping elements between said fluid inlet and said fluid outlet.

5. A damping device according to claim 1 wherein
said damping housing comprises a pot-shaped bottom part and a cover part being a flange, said bottom part having said damping chamber formed by a central recess therein, by said first partition wall, by said fluid inlet and by said fluid outlet, said cover part having said second partition wall on an engagement connection thereof received in said central recess.

6. A damping device according to claim 5 wherein
said engagement connection comprises a circumferential groove with a sealing ring disposed thereon, said sealing ring sealing said damping chamber from an environment on an exterior of said damping housing.

7. A damping device according to claim 5 wherein
said cover part comprises multiple through-bores radially spaced from a central axis of said damping chamber; and
fixing screws extend through said bores and engage said bottom part affixing said cover part and said bottom part.

8. A damping device according to claim 7 wherein
said fixing screws are disposed uniformly along an outer periphery of said damping housing, said outer periphery encompassing said damping chamber while leaving areas of said fluid inlet and said fluid outlet exposed.

9. A damping device according to claim 1 wherein
said fluid inlet comprises a seating receiving a sealing ring encompassing said fluid inlet; and
said fluid outlet comprises a seating receiving a sealing ring encompassing said fluid outlet.

10. A damping device according to claim 1 wherein
at least one of said fluid inlet or said fluid outlet having fixing bolts in a surrounding area thereof making said damping housing affixable to another component.

11. A damping device according to claim 1 wherein
said partition walls are rigid and fixed.

12. A damping device according to claim 1 wherein
said damping housing comprises a bottom part with said first partition wall and with a peripheral wall and comprises cover part with a flange overlying said peripheral wall and with said second partition wall; and
said first inlet and said fluid outlet extend through said peripheral wall.

13. A damping device according to claim 1 wherein
said equal cross-sectional diameters of said fluid inlet and said fluid outlet are constant along entire lengths thereof.

14. A damping device according to claim 1 wherein
said equal cross-sectional diameters of said fluid inlet and said fluid outlet are at openings thereof directly into said damping chamber.

15. A damping device for damping pressure shocks in hydraulic supply circuits, the damping device comprising:

a damping housing surrounding a damping chamber;
a fluid inlet in said damping housing directly adjacent to and connected to said damping chamber in fluid communication, said fluid inlet having an inlet cross-sectional diameter;
a fluid outlet in said damping housing directly adjacent to and connected to said damping chamber in fluid communication, said fluid outlet having an outlet cross-sectional diameter, said damping chamber extending between said fluid inlet and said fluid outlet such that a fluid flow from said fluid inlet in a through-flow direction traverses said damping chamber in a direction of said fluid outlet;
fixed sidewalls extending between said fluid inlet and said fluid outlet defining a lateral periphery of said damping chamber, and being spaced apart in directions perpendicular to the through-flow direction by distances greater than said cross-sectional diameters; and
planar, parallel and fixed first and second partition walls defining opposite sides of said damping chamber an entire extent thereof between said fluid inlet and said fluid outlet, opposite transverse cross-sectional portions of said fluid inlet and said outlet being axially aligned with the respective partition walls, said damping chamber defined only by said fixed sidewalls and said partition walls, said inlet and said outlet cross-sectional diameters being each equal to a distance spacing said partition walls.

16. A damping device according to claim 15 wherein
said damping chamber comprises a disk-shaped hollow space in said damping housing.

17. A damping device according to claim 16 wherein
said hollow space is at least one of cylindrical or polygon.

18. A damping device according to claim 15 wherein
said damping chamber is free of structures between sidewalls and said partition walls.

19. A damping device according to claim 15 wherein
said damping housing comprises a pot-shaped bottom part and a cover part being a flange, said bottom part having said damping chamber formed by a central recess therein, by said first partition wall, by said fluid inlet and by said fluid outlet, said cover part having said second partition wall on an engagement connection thereof received in said central recess.

20. A damping device according to claim 19 wherein
said engagement connection comprises a circumferential groove with a sealing ring disposed thereon, said sealing ring sealing said damping chamber from an environment on an exterior of said damping housing.

21. A damping device according to claim 19 wherein
said cover part comprises multiple through-bores radially spaced from a central axis of said damping chamber; and
fixing screws extend through said bores and engage said bottom part affixing said cover part and said bottom part.

22. A damping device according to claim 21 wherein
said fixing screws are disposed uniformly along an outer periphery of said damping housing, said outer periphery encompassing said damping chamber while leaving areas of said fluid inlet and said fluid outlet exposed.

23. A damping device according to claim 15 wherein
said damping housing comprises a bottom part with said first partition wall and with a peripheral wall and comprises cover part with a flange overlying said peripheral wall and with said second partition wall; and said first inlet and said fluid outlet extend through said peripheral wall.

24. A damping device according to claim 15 wherein said equal cross-sectional diameters of said fluid inlet and said fluid outlet are constant along entire lengths thereof.

25. A damping device according to claim 15 wherein said equal cross-sectional diameters of said fluid inlet and said fluid outlet are at openings thereof directly into said damping chamber.

\* \* \* \* \*